(12) United States Patent
Bowman (10) Patent No.: US 9,759,245 B2
(45) Date of Patent: Sep. 12, 2017

(54) ANTI-ROTATIONAL CIRCLIP (71) Applicant: Caterpillar Inc., Peoria, IL (US)

(72) Inventor: Thomas Bowman, Greenfield, IN (US)

(73) Assignee: Caterpillar Inc., Peoria, IL (US)

( * ) Notice: Subject to any disclaimer, the term of this patent is extended or adjusted under 35 U.S.C. 154(b) by 198 days.

(21) Appl. No.: 14/571,616

(22) Filed: Dec. 16, 2014

(65) Prior Publication Data

US 2016/0169255 A1   Jun. 16, 2016

(51) Int. Cl.
*F16B 21/18* (2006.01)
*F16B 2/24* (2006.01)
*F02F 3/00* (2006.01)
*F16B 2/00* (2006.01)

(52) U.S. Cl.
CPC ............ *F16B 2/243* (2013.01); *F02F 3/0015* (2013.01); *F16B 2/005* (2013.01); *F16B 21/183* (2013.01)

(58) Field of Classification Search
CPC ........ F16B 21/18; F16B 21/186; F16B 2/243; F16B 2/005
USPC .................................................. 411/517–519
See application file for complete search history.

(56) References Cited

U.S. PATENT DOCUMENTS

| | | | | |
|---|---|---|---|---|
| 1,043,298 A * | 11/1912 | Clark | .................... | F16L 55/132 220/236 |
| RE18,144 E * | 8/1931 | Heiermann | ................ | F16J 1/18 285/321 |
| 2,131,948 A * | 10/1938 | Graham | ................ | F16B 21/183 384/903 |
| 2,420,921 A | 5/1947 | Waldes | | |
| 2,595,787 A * | 5/1952 | Heimann | ................ | F16B 21/18 24/16 R |
| 2,749,162 A | 6/1956 | Humphrey | | |
| 2,788,498 A | 4/1957 | Hardaway | | |
| 2,883,899 A * | 4/1959 | Bluth | ..................... | B21D 53/16 411/518 |
| 2,886,382 A * | 5/1959 | Baublys | .................. | F16B 21/18 384/537 |
| 3,762,455 A | 10/1973 | Anderson, Jr. | | |
| 4,006,659 A * | 2/1977 | Wurzel | .................... | F16B 21/18 384/903 |
| 4,183,280 A * | 1/1980 | Hashimoto | ........... | F16B 21/186 403/DIG. 7 |
| 4,256,010 A * | 3/1981 | Petrie | ..................... | F16B 21/18 411/518 |

(Continued)

FOREIGN PATENT DOCUMENTS

CN   103883603   6/2014
GB   359836 A   10/1931

(Continued)

*Primary Examiner* — Flemming Saether (57) ABSTRACT

In one aspect, a circlip includes a circlip body defining (i) a first end surface, (ii) a second end surface spaced circumferentially from the first end surface so as to define a gap between the first and second end surfaces, and (iii) an outer curved surface defining an outer perimeter of the circlip body. The outer curved surface extends from the first end surface to the second end surface. Further, the circlip includes at least one row of teeth defined at the outer curved surface, and extending from at least one of the first and second end surfaces circumferentially along a direction away from the gap. When installed in a circlip groove, the teeth engage the circlip groove to limit rotation of the circlip within the groove.

12 Claims, 4 Drawing Sheets

(56) References Cited

U.S. PATENT DOCUMENTS

| | | | | |
|---|---|---|---|---|
| 4,343,581 A | * | 8/1982 | Millheiser | F16B 21/18 |
| | | | | 411/353 |
| 5,758,909 A | | 6/1998 | Dole et al. | |
| 6,062,611 A | * | 5/2000 | Percebois | F16L 37/092 |
| | | | | 285/232 |
| 7,364,395 B2 | * | 4/2008 | Grimmer | F16B 21/18 |
| | | | | 403/DIG. 7 |
| 2004/0253050 A1 | | 12/2004 | Eidam | |

FOREIGN PATENT DOCUMENTS

| | | |
|---|---|---|
| JP | H0642514 | 2/1994 |
| KR | 20110023626 | 3/2011 |

* cited by examiner

ANTI-ROTATIONAL CIRCLIP

TECHNICAL FIELD

The present disclosure relates to mechanical fasteners, and more specifically to circlips used in, for example, engine piston assemblies.

BACKGROUND

In at least some internal combustion engines, a connecting rod is connected to a piston using a piston pin. When installed, the piston pin extends through a bushing on the connecting rod such that first and second ends of the piston protrude from opposite sides of the bushing. The first end of the piston is positioned within a first pin boss on a first side of the piston, and the second end of the piston is positioned within a second pin boss on a second side of the piston. Typically, the piston is coupled to the first and second pin bosses in one of three different configurations. In a first configuration, the piston pin is rotatably and axially fixed to the bosses. In this "fixed pin" configuration, the connecting rod is permitted to rotate about the piston pin, but the piston pin does not rotate within the bosses. In a second configuration, the piston pin is rotatably and axially fixed to the connecting rod. In this "semi-floating pin" configuration, the piston pin is permitted to rotate within the bosses; however, the connecting rod is fixed to the piston pin such that the piston pin and connecting rod rotate together. In a third configuration, the piston pin is axially, but not rotatably, fixed to the bosses using a pair of circlips (also known as a c-clip or snap ring). In this "full-floating pin" configuration, each circlip is positioned within a groove in a respective one of the bosses, and the piston pin is trapped between the pair of circlips. The piston pin is permitted to rotate within the bosses, and the connecting rod is permitted to rotate about the piston pin.

In a "full-floating pin" configuration, rotation of the piston pin against each circlip can cause the circlip to rotate. If one end of the circlip rotates closer to the other end, then the circlip can compress, possibly resulting in the circlip being inadvertently released from its groove. Further, rotation of the circlip can cause the circlip to wear, possibly resulting in failure of the circlip.

Great Britain (G.B.) patent number 359,836 discloses a circlip having curved serrations or scallops spaced at equal intervals around its circumference, where the serrations impart resilience to the circlip without interfering with the circlip's strength. When expanded into its operative position, the circlip prevents axial displacement of a grudgeon pin during operation. However, G.B. patent number 359,836 does not address limiting rotation of the circlip so as to limit wear or inadvertent release of the circlip.

SUMMARY

In one aspect of the present disclosure, a circlip can include a circlip body and at least one row of teeth. The circlip body, in turn, can define (i) a first end surface, (ii) a second end surface that is spaced circumferentially from the first end surface so as to define a gap between the first and second end surfaces, and (iii) an outer curved surface that defines an outer perimeter of the circlip body. The outer curved surface can extend from the first end surface to the second end surface, and can terminate at each of the first and second end surfaces. The at least one row of teeth can be defined at the outer curved surface and can extend from at least one of the first and second end surfaces circumferentially along a direction away from the gap.

In another aspect of the present disclosure, a circlip can include a curved circlip body, a first coupling member, a second coupling member, a middle portion, and a plurality of teeth. The curved circlip body can define an outer curved surface that defines an outer perimeter of the circlip body, and an inner curved surface opposite the outer curved surface along a radial direction, such that the inner curved surface defines an inner perimeter of the circlip body. The first coupling member can be defined by a first end of the circlip body, and the second coupling member can be defined by a second end of the circlip body, wherein the second end is spaced from the first end so as to define a gap between the first end and the second end. The plurality of teeth can be defined by the outer curved surface at each of the first and second coupling members, and the middle portion can be defined by the circlip body at a location between the first and second coupling members. The first coupling member can define a first coupling member width along the radial direction from the inner curved surface to the outer curved surface, and the second coupling member can define a second coupling member width along the radial direction from the inner curved surface to the outer curved surface. The middle portion can define a middle-portion width along the radial direction from the inner curved surface to the outer curved surface, and the middle-portion width can be less than each of the first and second coupling member widths.

In yet another aspect of the present disclosure, a circlip can include a circlip body, a first coupling member, a first plurality of teeth, a second coupling member, and a second plurality of teeth. The circlip body can define a central axis oriented along an axial direction, and can define an inner curved surface and an outer curved surface spaced from the inner curved surface along a radial direction that is perpendicular to the axial direction. The first coupling member can extend in a circumferential direction about the central axis. The first plurality of teeth can be defined by the outer curved surface, and can be arranged along at least a portion of the first coupling member. The second coupling member can extend in the circumferential direction about the central axis, wherein the circlip body can define a circumferential gap that extends from the first coupling member to the second coupling member. The second plurality of teeth can be defined by the outer curved surface and can be arranged along at least a portion of the second coupling member, wherein the first coupling member can be spaced from the second coupling member along the circlip body in the circumferential direction.

BRIEF DESCRIPTION OF THE DRAWINGS

The foregoing summary, as well as the following detailed description of embodiments of the application, will be better understood when read in conjunction with the appended drawings. For the purposes of illustrating the methods and apparatuses of the present application, there is shown in the drawings representative embodiments. It should be understood, however, that the application is not limited to the precise methods and apparatuses shown. In the drawings.

DETAILED DESCRIPTION

Certain terminology is used in the following description for convenience only and is not limiting. The words "right", "left", "lower" and "upper" designate directions in the drawings to which reference is made. The words "inner" or "distal" and "outer" or "proximal" refer to directions toward and away from, respectively, the geometric center of the piston assembly and/or circlip and related parts thereof. The terminology includes the above-listed words, derivatives thereof and words of similar import.

Figure 1:
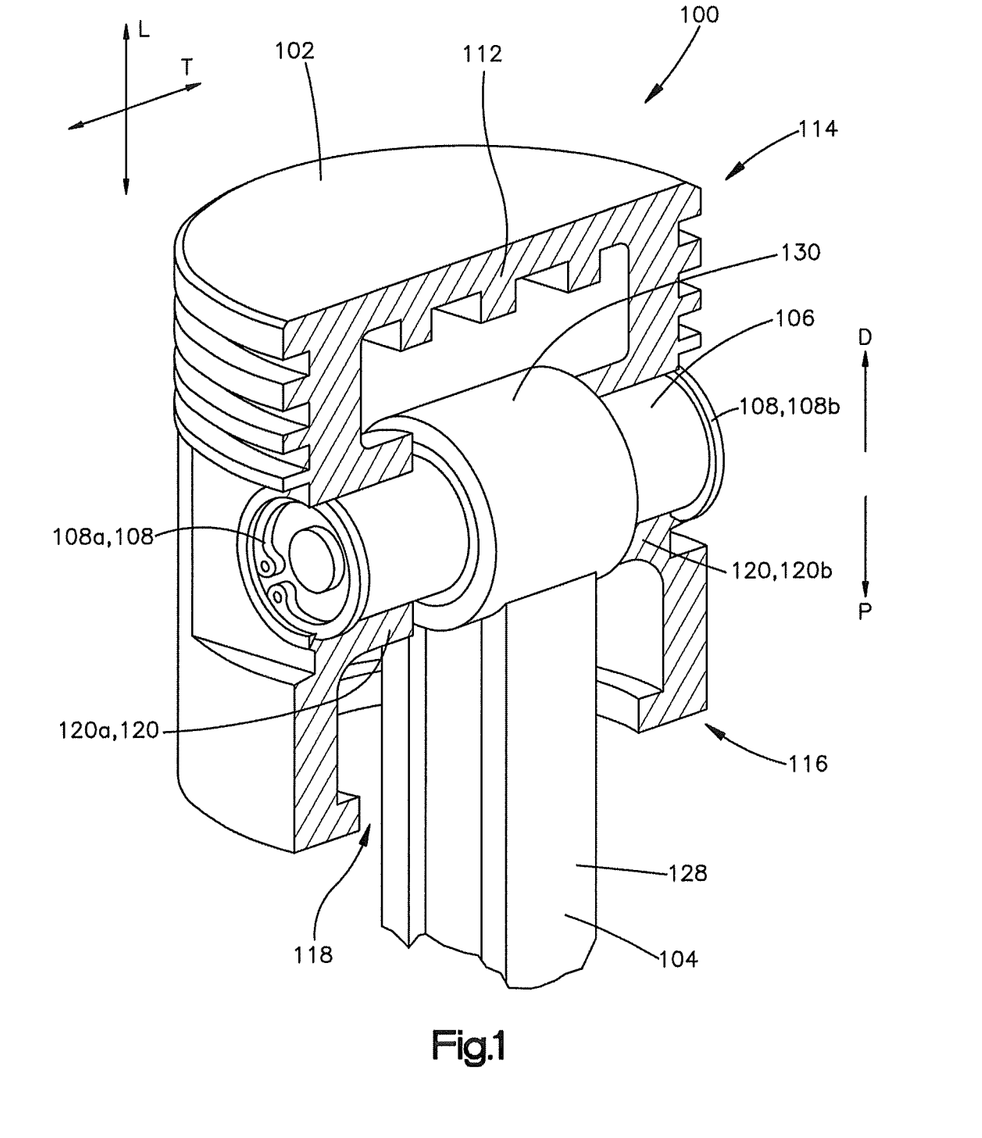
FIG. 1 is a partially-sectioned perspective view of a piston assembly according to one embodiment, where a portion of a piston is cut away to expose a piston pin, a connecting rod, and a pair of circips.
Figure 2:
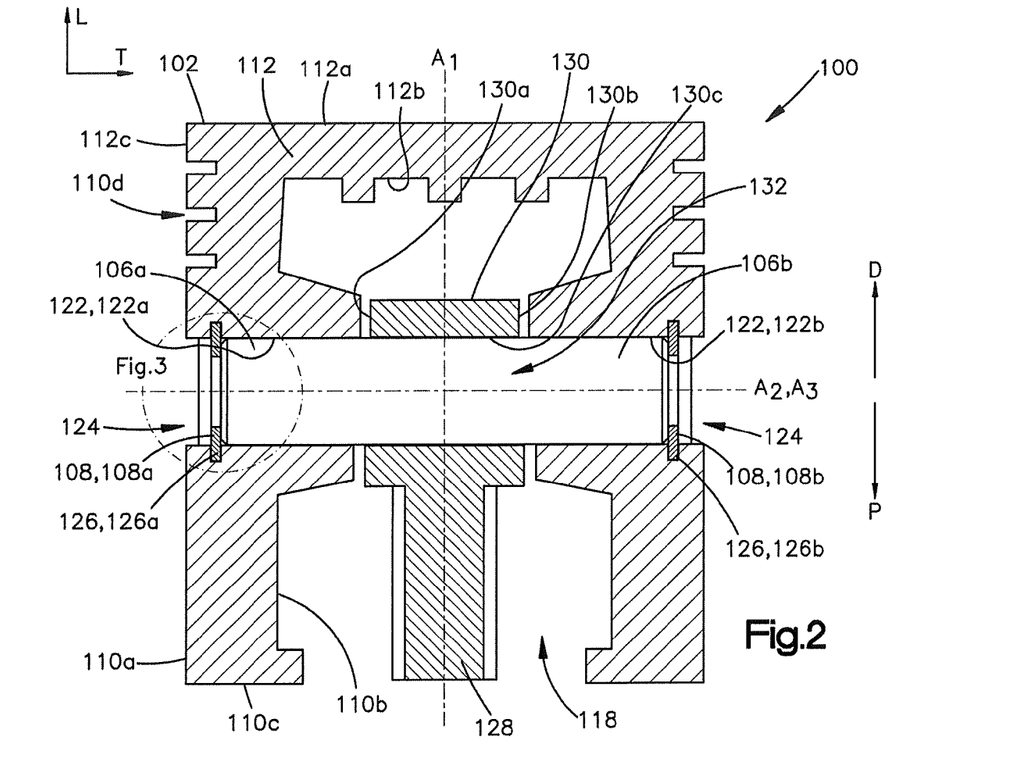
FIG. 2 is a cross-sectional side view of the piston assembly of FIG. 1.

Referring to FIGS. 1 and 2, a piston assembly 100 includes a piston 102, a piston pin 106, at least one circlip 108 that is supported by the piston 102 and, in turn, supports the piston pin 106. For instance, the at least one circlip 108 can include a pair of circlips, such as a first circlip 108a and a second circlip 108b. The piston assembly 100 can further include a connecting rod 104 that is supported by the piston pin 106 at a location between the first and second circlips 108a and 108b.

The piston 102 defines a proximal end 116 and a distal end 114 that is opposite the proximal end 116 along a longitudinal direction L. Thus, the piston 102, can define a distal direction D from the proximal end 116 to the distal end 114. The piston can further define a proximal direction P from the distal end 114 to the proximal end 116. The piston 102 defines a central axis $A_1$ that extends along the longitudinal direction L between the proximal end 116 and the distal end 114. The piston 102 can include an end wall 112 that closes the distal end 114 of the piston 102. Thus, the piston 102 can define a piston cavity 118 that extends from the proximal end 116 to the end wall 112. Thus, the piston cavity 118 can terminate at the end wall 112. The piston cavity 118 can be sized and shaped to receive a portion of the connecting rod 104. It is appreciated that FIG. 1 illustrates a first half of the piston 102, and the second half of the piston 102 may be a mirror image of the first half.

The piston 102 can include at least one piston wall 110 that extends from the end wall 112 in the proximal direction P. For instance, the at least one piston wall 110 can partially define the piston cavity 118. The at least one piston wall 110 can be configured as an annular wall, or a plurality of interconnected walls as desired. The at least one piston wall 110 defines an outer curved surface 110a that defines an outer perimeter of the piston 102, and an inner curved surface 110b that is opposite the outer curved surface and defines an inner perimeter of the piston 102. The inner curved surface 110b can be spaced radially inward from the outer curved surface 110a toward the central piston axis $A_1$. Similarly, the outer curved surface 110a can be spaced radially outward from the inner curved surface 110b away from the central piston axis $A_1$. Thus, the inner curved surface 110b can define a perimeter of the piston cavity 118.

The at least one piston wall 110 can further define a proximal end 110c, and a distal end 110d that is opposite the proximal end 110c in the longitudinal direction L, and spaced from the proximal end 110c in the distal direction D. Thus, the proximal end 110c of the at least one piston wall 110 can be spaced from the distal end 110d in the proximal direction P. It should be appreciated that the proximal end 116 of the piston 102 can be defined by the proximal end 110c of the at least one piston wall 110. Thus, the proximal end 110c can likewise be configured as an open end. The at least one piston wall 110, including each of the outer and inner curved surfaces 110a and 110b, can encircle the central piston axis $A_1$. Further, each of the outer and inner curved surfaces 110a and 110b can extend from the proximal end 110c of the piston 102 to the distal end 110d.

With continuing reference to FIGS. 1-2, the end wall 112 can be generally cylindrical in shape, and can further be centrally disposed about the central piston axis $A_1$. The end wall 112 defines an outer end surface 112a, an inner end surface 112b opposite the outer end surface 112a along the longitudinal direction L. The end wall 112 further defines a curved end surface 112c that extends from the outer end surface 112a to the inner end surface 112b. The inner end surface 112b can terminate at the distal end 110d of the piston wall 110. It should be appreciated that the end wall 112 can be monolithic with the piston wall 110.

The piston 102 can further include at least one pin boss 120 that is configured support the piston pin 106. For instance, the at least one pin boss 120 can include a pair of pin bosses 120, such as a first pin boss 120a and a second pin boss 120b. The pin bosses 120 can extend radially inward from the inner curved surface 110b of the piston wall 110 toward the central axis $A_1$. The pin bosses 120 are centered about a central pin axis $A_2$ that extends along a transverse direction T that is perpendicular to the longitudinal direction L. In one example, the central pin axis $A_2$ can intersect the central piston axis $A_1$. The pin bosses 120 can be monolithic with the piston wall 110 and the end wall 112.

The first pin boss 120a can cooperate with the piston wall 110 so as to receive a first end 106a of the piston pin 106. Similarly, the second pin boss 120b can cooperate with the piston wall 110 to receive a second end 106b of the piston pin 106 that is opposite the first end of the piston pin 106. For instance, the piston 102 can define a pin bore 124 that extends through the piston wall 110 and each of the first and second pin bosses 120a and 120b in the transverse direction T. Accordingly, the piston 102 can define at least one pin support surface 122 that is defined by both the piston wall 110 and the at least one pin boss 120. For instance, the piston 102 can define first and second pin support surfaces 122a and 122b that are defined by both the piston wall 110 and each of the first and second pin bosses 120a and 120b, respectively. The first and second pin support surfaces 122a and 122b can define the outer perimeter of the pin bore 124, and can be sized to support the piston pin 106 when the piston pin 106 is inserted into the pin bore 124.

Figure 3:
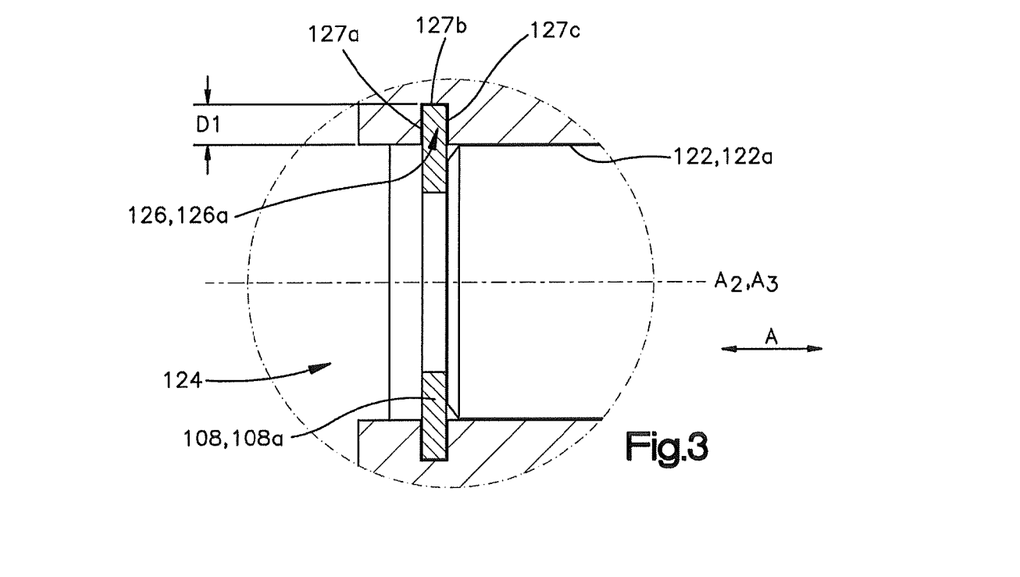
FIG. 3 is an enlarged cross-sectional side view of the circlip groove of the piston assembly of FIG. 2.

Referring now also to FIG. 3, the piston 102 can define at least one circlip groove 126 that extends into the at least one pin support surface 122. For instance, the piston 102 can define a first circlip groove 126a that extends into the first pin support surface 122a, and a second circlip groove 126b that extends into the second pin support surface 122b. Each circlip of the first and second circlip grooves 126a and 126b can extend circumferentially about the first and second pin support surfaces 122a and 122b, respectively. Each of the circlip grooves 126 can define an outer groove surface 127a, an inner groove surface 127b spaced radially inward from the outer groove surface 127a, and a curved groove surface 127c that extends from the outer groove surface 127a to the inner groove surface 127b. Each outer groove surface 127a and each inner groove surface 127b has an annular shape. The curved groove surfaces 127c can define an outer perimeter of the respective one of the circlip grooves 126. Further, each circlip groove 126 defines a groove depth $D_1$ measured from the curved groove surface 127c to the corresponding pin support surface 122.

With continuing reference to FIGS. 1-2, and as described above, the piston assembly 100 can include first and second circlips 108a and 108b. The first and second circlips 108a and 108b are sized and configured to be inserted into the first and second circlip grooves 126a and 126b, respectively. Further, the first and second circlips 108a and 108b are sized to receive the piston pin 106 such that the piston pin 106 is rotatable with respect to the piston 102 about the central pin axis $A_2$. The first and second circlips 108a and 108b can prevent the piston pin 106 from translating in the transverse direction T with respect to the piston 102. As will be described in further detail below, one or both of the first and second circlips 108a and 108b can include a plurality of teeth that contact the curved groove surface 127c so as to prevent the circlip(s) 108 from rotating circumferentially within the respective first and second circlip grooves 126a and 126b.

Figure 4:
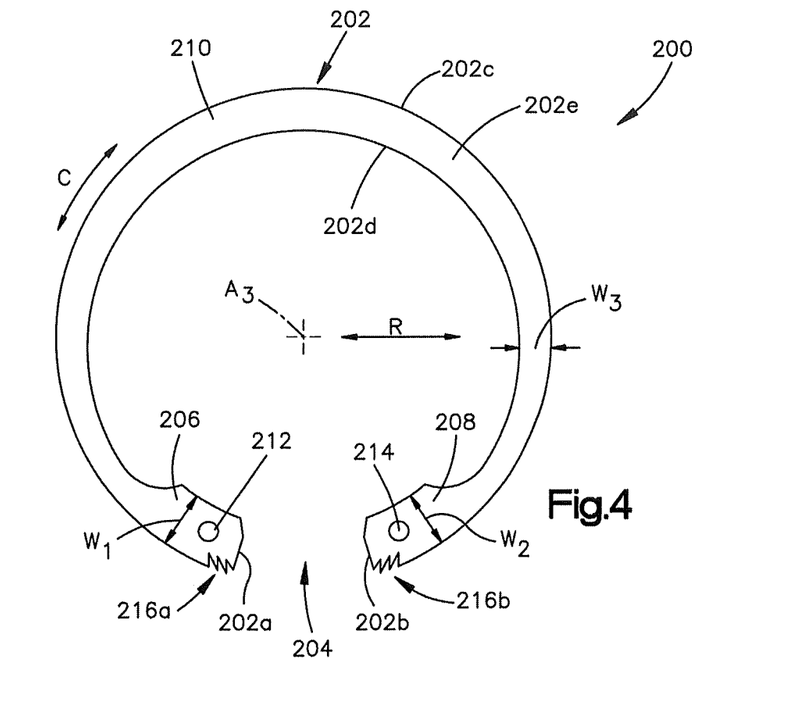
FIG. 4 is a plan view of a circlip according to one embodiment.
Figure 5:
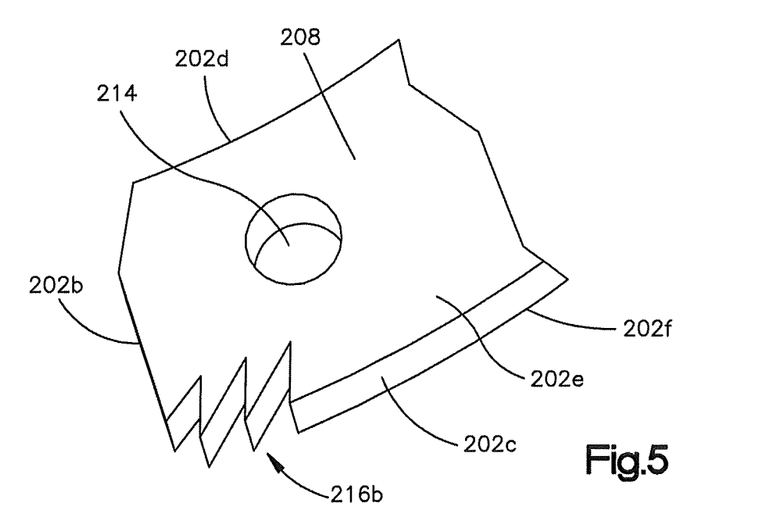
FIG. 5 is a perspective view of a coupling member of the circlip of FIG. 4.

Referring now to FIGS. 4-5, one embodiment of a circlip 200 is shown that may be used to implement one or both of the first and second circlips 108a and 108b illustrated in FIGS. 1-3. The circlip 200 is centrally disposed about a central circlip axis $A_3$ (see also FIG. 2) that is oriented along an axial direction A with respect to the circlip 200. The circlip 200 further defines a radial direction R that is oriented perpendicular to the axial direction A. For instance, a radially outer direction can be defined as a direction along the radial direction R away from the central circlip axis $A_3$. A radially inner direction can be defined as a direction along the radial direction R toward the central circlip axis $A_3$. It should be appreciated, of course, that the radial direction R, and thus the radially outer direction and the radially inner direction, can intersect the central circlip axis $A_3$ or can be offset from the central circlip axis $A_3$.

The circlip 200 includes a curved circlip body 202 that defines a first end surface 202a and a second end surface 202b spaced from the first end surface 202a along a circumferential direction C. The circlip body 202 can further define an outer curved surface 202c and an inner curved surface 202d that is opposite the outer curved surface 202c along the radial direction R. The inner and outer curved surfaces 202c and 202d can extend from the first end surface 202a to the second end surface 202b in the circumferential direction C, and can terminate at each of the first and second end surfaces 202a and 202b. The circlip body 202 can further include an upper surface 202e and a lower surface 202f that is opposite the upper surface 202e along the axial direction A. Each of the upper surface 202e and the lower surface 202f can extend from the outer curved surface 202c to the inner curved surface 202d.

The circlip body 202 can define a gap 204 that extends between the first and second end surfaces 202a and 202b. For instance, the gap 204 can extend from the first end surface 202a to the second end surface 202b. The inner curved surface 202d defines an inner perimeter of the circlip body 202. The outer curved surface 202c defines an outer perimeter of the circlip body 202. In this embodiment, an entirety of outer curved surface 202c, from the first end surface 202a to the second end surface 202b, can be defined by a constant diameter when the circlip is in the expanded position, although embodiments of the disclosure are not so limited. The upper and lower surfaces 202e and 202f of the circlip body 202 can be planar or otherwise shaped as desired. For instance, each of the upper and lower surfaces 202e and 202f can extend along respective planes that are normal to the central circlip axis $A_3$. The respective planes can be oriented parallel to each other.

The circlip 200 can transition between an expanded position and a compressed position. The circlip 200 can be in the expanded position at rest, and reduced to a compressed position. The circlip 200 can further be resilient so as to be naturally biased toward the expanded position from the compressed position. When the circlip 200 is in the expanded position (shown in FIG. 4), the circlip body 202 defines a first and second opposed points on the outer curved surface 202c that are spaced from each other a first distance along a straight line that extends from the first point to the second point. The straight line can be oriented along the radial direction R, and can further extend through the central circlip axis $A_3$. When the circlip 200 is in the compressed position, the first and second points are spaced a second distance, less than the first distance, along a straight line that extends from the first point to the second point. Again, the straight line can extend along the radial direction R.

The circlip body 202 comprises a first coupling member 206, a second coupling member 208, and a middle portion 210 disposed between the first coupling member 206 and the second coupling member 208. For instance, the middle portion 210 can extend from the first coupling member 206 to the second coupling member 208. The first coupling member 206 extends along the circumferential direction C from the first end surface 202a away from the gap 204, and the second coupling member 208 extends along the circumferential direction C from the second end surface 202b away from the gap 204. The circlip body 202 defines a first aperture 212 that extends at least into the first coupling member 206 in the axial direction A. For instance the first aperture 212 can extend through the first coupling member 206 in the axial direction A from the upper surface 202e to the lower surface 202f. Similarly, the circlip body 202 can define a second aperture 214 that extends at least into the second coupling member 208 in the axial direction A. For instance, the second aperture 214 can extend through the second coupling member 208 in the axial direction A from the upper surface 202e to the lower surface 202f. The middle portion 210 extends along the circumferential direction C from the first coupling member 206 to the second coupling member 208.

The first coupling member 206 defines a first coupling member width $W_1$ along the radial direction R from the inner curved surface 202d to the outer curved surface 202c, and the second coupling member 208 defines a second coupling member width $W_2$ along the radial direction R from the inner curved surface 202d to the outer curved surface 202c. Further, the middle portion defines a middle-portion width $W_3$ along the radial direction R from the inner curved surface 202d to the outer curved surface 202c. As shown, the middle-portion width $W_3$ may vary between the first coupling member 206 to the second coupling member 208. In this embodiment, the middle-portion width $W_3$ is smallest closest to the first and second coupling members 206 and 208, and largest midway between the first and second coupling members 206 and 208. In other words, the middle-portion width $W_3$ increases along the circumferential direction from the first coupling member 206 toward the midway point between the first and second coupling members 206 and 208, and decreases from the midway point to the second coupling member 208. It will be understood that, in alternative embodiments, the middle-portion width $W_3$ may vary in another manner or may be constant.

The middle-portion width $W_3$ as measured closest to the first and second coupling members 206 and 208 (i.e., where $W_3$ is smallest), and as measured at the midpoint between the first and second coupling members 206 and 208 (i.e., where $W_3$ is largest), is less than each of the first and second coupling member widths $W_1$ and $W_2$. However, according to alternative embodiments, the first and second coupling member widths $W_1$ and $W_2$ may be between the smallest and largest measurements of the middle-portion width $W_3$ or may be less than or equal to the smallest measurement of the middle-portion width $W_3$. Further, the middle-portion width $W_3$ is greater than the groove depth $D_1$ (see FIG. 3) along at least a portion of the circumferential length of the circlip body 202. Thus, when the circlip 200 is positioned within the first or second circlip groove 126a or 126b of the piston 102, the circlip body 202 is configured to abut one end of the piston pin 106 to prevent the piston pin 106 from translating past the respective circlip groove along the central pin axis $A_2$.

The circlip 200 can further include a plurality of teeth 216 that extend from or into the outer curved surface 202c of the circlip body 202. The plurality of teeth 216 can be arranged along a row. The row can be discontinuous along the circumferential direction from the first end surface 202a, through the middle portion 210, to the second end surface 202b. The row includes a first portion 216a of teeth 216 that extends from the first end surface 202a along at least a portion of the first coupling member 206 and away from the gap 204, and a second portion 216b of teeth 216 that extends from the second end surface 202b along at least a portion of the second coupling member 208 and away from the gap 204. Further, the teeth 216 do not extend along the middle portion 210 such that the outer curved surface 202c is substantially smooth between the first and second coupling members 206 and 208. Thus, it can be said that the row of teeth 216 terminates at each of the first and second end surfaces 202a and 202b.

Each tooth of the plurality of teeth 216 can be oriented in the axial direction A from the upper surface 202e to the lower surface 202f. Further, at least some up to all of the teeth 216 of the first portion 216a are inclined toward the first end surface 202a as they extend along the radial direction R from the inner curved surface 202d to the outer curved surface 202c. Further still, at least some up to all of the teeth of the second portion 216b are inclined toward the second end surface 202b as they extend along the radial direction R from the inner curved surface 202d to the outer curved surface 202c.

With reference to FIGS. 3-5, the first and second apertures 212 and 214 can be configured to be coupled to an instrument such as (without limitation) circlip pliers. In one example, the circlip pliers can grip the circlip 200 in the first and second apertures 212 and 214 so as to install the circlip 200 into the circlip groove 126. The instrument can then transition the circlip 200 from the expanded position to the compressed position by applying a compression force to the circlip 200 that is sufficient to decrease the gap 204. Decreasing the gap 204 thereby decreases a cross-sectional dimension of the outer surface 202c of the circlip body 202 along the radial direction, as described above. When the circlip 200 is in the compressed position, the circlip 200 is configured for insertion into the pin bore 124 such that the outer curved surface 202c of the circlip 200 aligns with the curved groove surface 127c of the circlip groove 126. The circlip 200 is then transitioned from the compressed position to the expanded position such that the outer curved surface 202c of the circlip 200 expands against the curved groove surface 127c of the circlip groove 126.

After expanding the circlip 200 into the circlip groove 126, the inner and outer groove surfaces 127a and 127b of the circlip groove 126 interfere with the upper and lower surfaces 202e and 202f of the circlip 200, respectively, to prevent movement of the circlip 200 in the axial direction A (i.e., along the central pin axis $A_2$). Further, the teeth 216 engage the curved groove surface 127c so as to limit the rotation of (i) the first coupling member 206 in the circumferential direction C closer to the second coupling member 208 and (ii) the second coupling member 208 in the circumferential direction C closer to the first coupling member 206. Limiting the rotation of the coupling members with respect to each other may prevent the circlip 200 from transitioning to the compressed position while the piston 102 is in use. Preventing the circlip 200 from transitioning to the compressed position may, in turn, prevent the circlip 200 from being inadvertently released from the circlip groove 126. Further, limiting the rotation of the first and second coupling members 206 and 208 may limit the rotation of an entirety of the circlip body 302 in the circumferential direction C. Limiting the rotation of the circlip body 302 may prevent the outer curved surface 302c of the circlip 300 from rubbing against the curved groove surface 127c, and consequently, may limit wearing of the outer curved surface 302c of the circlip 300.

Figure 6:
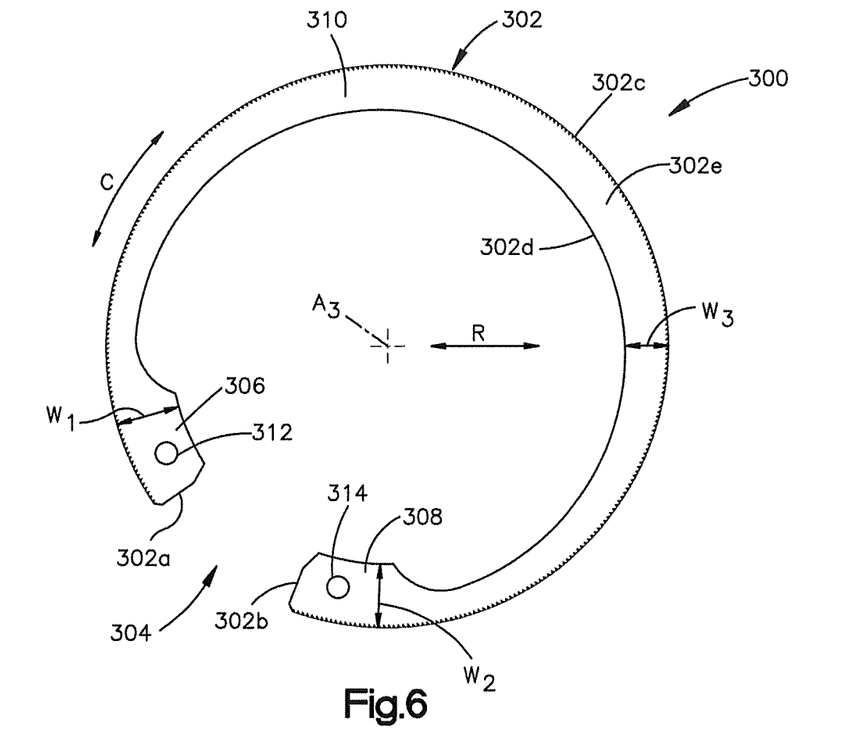
FIG. 6 is a plan view of a circlip according to an alternative embodiment.
Figure 7:
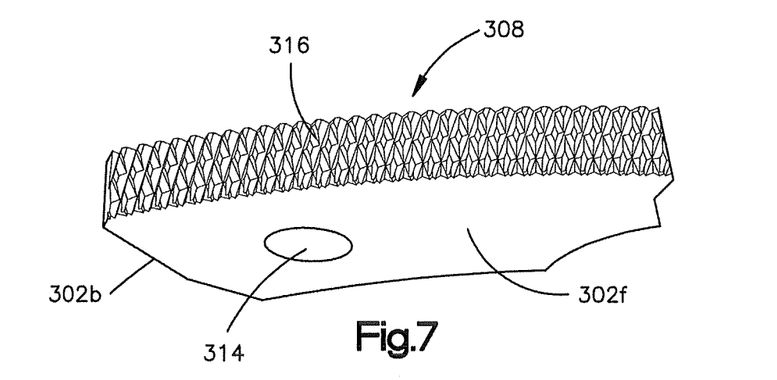
FIG. 7 is a perspective view of a coupling member of the circlip of FIG. 6.

Referring now to FIGS. 6 and 7, another embodiment of a circlip 300 is shown that may be used to implement one or both of the circlips 108 of FIGS. 1-3. As will be described in further detail below, the circlip 300 is similar to the circlip 200 except that the configuration of teeth 316 of circlip 300 is different from that of teeth 216.

The circlip 300 is centrally disposed about a central circlip axis $A_3$ (see also FIG. 2) that is oriented along an axial direction A with respect to the circlip 300. The circlip 300 further defines a radial direction R that is oriented perpendicular to the axial direction A. For instance, a radially outer direction can be defined as a direction along the radial direction R away from the central circlip axis $A_3$. A radially inner direction can be defined as a direction along the radial direction R toward the central circlip axis $A_3$. It should be appreciated, of course, that the radial direction R, and thus the radially outer direction and the radially inner direction, can intersect the central circlip axis $A_3$ or can be offset from the central circlip axis $A_3$.

The circlip 300 includes a curved circlip body 302 that defines a first end surface 302a and a second end surface 302b spaced from the first end surface 302a along a circumferential direction C. The circlip body 302 can further define an outer curved surface 302c and an inner curved surface 302d that is opposite the outer curved surface 302c along the radial direction R. The outer and inner curved surfaces 302c and 302d can extend from the first end surface 302a to the second end surface 302b in the circumferential direction C, and can terminate at each of the first and second end surfaces 302a and 302b. The circlip body 302 can further include an upper surface 302e and a lower surface 302f that is opposite the upper surface 302e along the axial direction A. Each of the upper surface 302e and the lower surface 302f can extend from the outer curved surface 302c to the inner curved surface 302d.

The circlip body 302 can define a gap 304 that extends between the first and second end surfaces 302a and 302b. For instance, the gap 304 can extend from the first end surface 302a to the second end surface 302b. The inner curved surface 302d defines an inner perimeter of the circlip body 302. The outer curved surface 302c defines an outer perimeter of the circlip body 302. In this embodiment, an entirety of outer curved surface 302c, from the first end surface 302a to the second end surface 302b, can be defined by a constant diameter when the circlip is in the expanded position, although embodiments of the disclosure are not so limited. The upper and lower surfaces 302e and 302f of the circlip body 302 can be planar or otherwise shaped as desired. For instance, each of the upper and lower surfaces 302e and 302f can extend along respective planes that are normal to the central circlip axis $A_3$. The respective planes can be oriented parallel to each other.

The circlip 300 can transition between an expanded position and a compressed position. The circlip 300 can be in the expanded position at rest, and reduced to a compressed position. The circlip 300 can further be resilient so as to be naturally biased toward the expanded position from the compressed position. When the circlip 300 is in the expanded position (shown in FIG. 4), the circlip body 302 defines a first and second opposed points on the outer curved surface 302c that are spaced from each other a first distance along a straight line that extends from the first point to the second point. The straight line can be oriented along the radial direction R, and can further extend through the central circlip axis $A_3$. When the circlip 300 is in the compressed position, the first and second points are spaced a second distance, less than the first distance, along a straight line that extends from the first point to the second point. Again, the straight line can extend along the radial direction R.

The circlip body 302 comprises a first coupling member 306, a second coupling member 308, and a middle portion 310 disposed between the first coupling member 306 and the second coupling member 308. For instance, the middle portion 310 can extend from the first coupling member 306 to the second coupling member 308. The first coupling member 306 extends along the circumferential direction C from the first end surface 302a away from the gap 304, and the second coupling member 308 extends along the circumferential direction C from the second end surface 302b away from the gap 304. The circlip body 302 defines a first aperture 312 that extends at least into the first coupling member 306 in the axial direction A. For instance the first aperture 312 can extend through the first coupling member 306 in the axial direction A from the upper surface 302e to the lower surface 302f. Similarly, the circlip body 302 can define a second aperture 314 that extends at least into the second coupling member 308 in the axial direction A. For instance, the second aperture 314 can extend through the second coupling member 308 in the axial direction A from the upper surface 302e to the lower surface 302f. The middle portion 310 extends along the circumferential direction C from the first coupling member 306 to the second coupling member 308.

The first coupling member 306 defines a first coupling member width $W_1$ along the radial direction R from the inner curved surface 302d to the outer curved surface 302c, and the second coupling member 308 defines a second coupling member width $W_2$ along the radial direction R from the inner curved surface 302d to the outer curved surface 302c. Further, the middle portion defines a middle-portion width $W_3$ along the radial direction R from the inner curved surface 302d to the outer curved surface 302c. As shown, the middle-portion width $W_3$ may vary between the first and second coupling member 306 to the second coupling member 308. In this embodiment, the middle-portion width $W_3$ is smallest closest to the first and second coupling members 306 and 308, and largest midway between the first and second coupling members 306 and 308. In other words, the middle-portion width $W_3$ increases along the circumferential direction from the first coupling member 306 toward the midway point between the first and second coupling members 306 and 308, and decreases from the midway point to the second coupling member 308. It will be understood that, in alternative embodiments, the middle-portion width $W_3$ may vary in another manner or may be constant.

The middle-portion width $W_3$ as measured closest to the first and second coupling members 306 and 308 (i.e., where $W_3$ is smallest), and as measured at the midpoint between the first and second coupling members 306 and 308 (i.e., where $W_3$ is largest), is less than each of the first and second coupling member widths $W_1$ and $W_2$. However, according to alternative embodiments, the first and second coupling member widths $W_1$ and $W_2$ may be between the smallest and largest measurements of the middle-portion width $W_3$ or may be less than or equal to the smallest measurement of the middle-portion width $W_3$. Further, the middle-portion width $W_3$ is greater than the groove depth $D_1$ (see FIG. 3) along at least a portion of the circumferential length of the circlip body 302. Thus, when the circlip 300 is positioned within a circlip groove 126 of the piston 102, the circlip body 302 is configured to abut one end of the piston pin 106 to prevent the piston pin 106 from translating past the circlip groove 126 along the central pin axis $A_2$.

The circlip 300 can further include a plurality of teeth 316 that extend from or into the outer curved surface 302c of the circlip body 302 along the first coupling member 306, the second coupling member 308, and the middle portion 310. The plurality of teeth 316 can be arranged in a plurality of rows that extend continuously (i.e., uninterrupted) along the circumferential direction C from the first end surface 302a away from the gap 304 and around the outer curved surface 302c to the second end surface 302b. Thus, it can be said that the rows of teeth 316 terminate at each of the first and second end surfaces 302a and 302b. The rows of teeth 316 are spaced from one another in the axial direction A from the upper surface 302e to the lower surface 302f. Further, the teeth 316 are knurled.

With reference to FIGS. 3 and 6-7, the first and second apertures 312 and 314 can be configured to be coupled to an instrument such as (without limitation) circlip pliers. In one example, the circlip pliers can grip the circlip 300 in the first and second apertures 312 and 314 so as to install the circlip 300 into the circlip groove 126. The instrument can then transition the circlip 300 from the expanded position to the compressed position by applying a compression force to the circlip 300 that is sufficient to decrease the gap 304. Decreasing the gap 304 thereby decreases a cross-sectional dimension of the outer surface 302c of the circlip body 302 along the radial direction, as described above. When the circlip 300 is in the compressed position, the circlip 300 is configured for insertion into the pin bore 124 such that the outer curved surface 302c of the circlip 300 aligns with the curved groove surface 127c of the circlip groove 126. The circlip 300 is then transitioned from the compressed position to the expanded position such that the outer curved surface 302c of the circlip 300 expands against the curved groove surface 127c of the circlip groove 126.

After expanding the circlip 300 into the circlip groove 126, the inner and outer groove surfaces 127a and 127b of the circlip groove 126 interfere with the upper and lower surfaces 302e and 302f of the circlip 300, respectively, to prevent movement of the circlip 300 in the axial direction A (i.e., along the central pin axis $A_2$). Further, the teeth 316 engage the curved groove surface 127c so as to limit the rotation of the circlip body 302 in the circumferential direction C. Limiting the rotation of the circlip body 302 may prevent the outer curved surface 302c of the circlip 300 from rubbing against the curved groove surface 127c, and consequently, may limit wearing of the outer curved surface 302c of the circlip 300.

Although the circlip in FIGS. 4 and 5 was described as having one discontinuous row of teeth 216, embodiments of the disclosure are not so limited. According to alternative embodiments, the row of teeth 216 can extend continuously around the outer curved surface 202c of the circlip 200 from the first end surface 202a to the second end surface 202b. Further, the teeth 216 may be arranged in more than one row of teeth 216 along the axial direction A, wherein the rows of teeth 216 extend continuously or discontinuously around the outer curved surface 202c.

Further, although the circlip in FIGS. 6 and 7 was described as having a plurality of continuous rows of teeth 316, embodiments of the disclosure are not so limited. According to alternative embodiments, the rows of teeth 316 may extend discontinuously around the outer curved surface 302c of the circlip 300. For example, the rows of teeth 316 may extend along the outer curved surface 302c at the first and second coupling members 306 and 308 such that the outer curved surface 302c between the first and second coupling members 306 and 308 has no teeth extending therefrom (i.e., is smooth).

According to alternative embodiments, circlips may be envisioned that combine the inclined teeth 216 of FIGS. 4 and 5 with the knurled teeth 316 of FIGS. 6 and 7. For example, according to at least one embodiment, a circlip may have (i) inclined teeth such as inclined teeth 216 that extend along the outer curved surface of first and second coupling members and (ii) knurled teeth such as knurled teeth 316 that extend between the first and second coupling members.

Further, according to alternative embodiments, the teeth can extend from or into the outer curved surface in positions other than those shown in FIGS. 4 to 7. For example, according to some embodiments, a portion of teeth can extend along each of the coupling members and along the outer curved surface at the midway point between the first and second coupling members, such that the outer curved surface between each coupling member and the midway point is smooth. According to further embodiments, portions of teeth can extend from or into the outer curved surface at +90 degrees and −90 degrees of rotation from the midway point, while the outer curved surface extending in either direction from these portions are smooth.

Although FIGS. 4 to 7 show circlips having coupling members that have widths $W_1$ and $W_2$ that are larger than the width $W_3$ of the middle portion, embodiments of the disclosure are not so limited. According to alternative embodiments, widths $W_1$ and $W_2$ may be equal to or even smaller than the width $W_3$.

Further, although the circlips in FIGS. 4 to 7 are planar, embodiments of the present disclosure are not so limited. According to alternative embodiments, circlips may have, for example, a circular cross-section with teeth disposed on the outer curved portion of the circular cross-section.

Yet further, although the circlips in FIGS. 4 to 7 have apertures formed therein, embodiments of the disclosure are not so limited. In alternative embodiments, circlips may be implemented without apertures. Further, according to alternative embodiments, circlips may be implemented with coupling features other than apertures, such as pins that project from the upper surface of the circlips in place of the apertures, where the compressing force may be applied to the pins to transition the circlips to the compressed position. In embodiments that have coupling features, it may be said that the first coupling member extends from the first end surface of the circlip body (e.g., 202a, 302a) to at least the first coupling feature (e.g., first aperture 212 or first 312) and the second coupling member extends from the second end surface of the circlip body (e.g., 202b, 302b) to at least the second coupling feature (e.g., second aperture 214 or second aperture 314).

Referring back to FIGS. 1-2, the piston pin 106 is a cylindrical rod or tube having a first end 106a, and a second end 106b opposite the first end 106a. The piston pin 106 has a diameter that is sized to be received within the pin bore 124, and a length that is sized to be received between the first and second circlip grooves 126a and 126b in the pin bore 124. When installed in the piston assembly 100, the first end 106a of the piston pin 106 is supported by the first pin boss 120a and the second end 106b is supported by the second pin boss 120b such that the piston pin 106 is rotatable within the pin bore 124 about the central pin axis $A_2$.

The piston pin 106 supports the connecting rod 104, which includes a shaft 128 and a bushing 130. The bushing 130 is a generally cylindrically-shaped tube having a first end surface 130a and a second end surface 130b spaced from the first end surface 130a along the lateral direction A. The busing 130 defines an inner curved pin support surface 130c that in turn defines a pin bore 132. The pin bore 132 is sized to receive the piston pin 106, and the pin bore 132 is configured to be centered about the central pin axis $A_2$ when the connecting rod 104 is installed in the piston assembly 100. The pin support surface 130c and the pin bore 132 extend from the first end surface 130a to the second end surface 130b. When supported by the piston pin 106, the piston pin 106 extends through the pin bore 132 of the bushing 130 such that a first end 106a of the piston pin 106 extends outwardly along the lateral direction A from the first end surface 130a of the bushing 130 and a second end 106b of the piston pin 106 extends outwardly along the lateral direction A from the second end surface 130b of the bushing 130. The bushing 130 is supported by the piston pin 106 between the opposed pin bosses 120 so as to limit movement of the bushing 130 along the central pin axis $A_2$.

INDUSTRIAL APPLICABILITY

Referring back to FIGS. 1-2, circlips of the disclosure may be implemented in any suitable application, including in piston assemblies of combustion engines as described above. In a combustion engine, the piston assembly 100 converts reciprocating motion into rotating motion. In particular, the piston 102 reciprocates within a cylinder (not shown) back and forth between the proximal direction P and the distal direction D. As the piston 102 reciprocates, the bushing 130 of the connecting rod 104 also reciprocates back and forth between the proximal direction P and the distal direction D. Further, the bushing 130 rotates back and forth partially about the central pin axis $A_2$ such that the shaft 128 translates inside the piston cavity 118 between a first point on the inner curved surface 110b and a second point on the inner curved surface 110b, opposite the first point, and in a direction perpendicular to both the longitudinal direction L and the transverse direction T. While the bushing 130 reciprocates, the end of the connecting rod 104 opposite the bushing 130 rotates about a crank shaft.

Rotation of the bushing 130 may cause the piston pin 106 to rotate within the pin bore 124 as the pin support surface 130c of the bushing 130 contacts the piston pin 106. Further, rotation of the piston pin 106 may impart a rotational force on one or both of the circlips 108a and 108b about the central pin axis $A_2$ as the first end 106a of the piston pin 106 contacts the first circlip 108a and the second end 106b of the piston pin 106 contacts the second circlip 108b. However, as described above, one or both of the circlips 108a and 108b include a plurality of teeth extending from their respective outer curved surfaces, where the teeth are configured to engage with the circlip grooves 126a and 126b, respectively, to limit rotation of the circlips 108a and 108b within their respective circlip grooves. Limiting rotation of the circlips 108a and 108b within the circlip grooves 126a and 126b, respectively, may reduce or eliminate wear of the outer curved surface of each circlip 108a and 108b and may prevent each circlip 108a and 108b from inadvertently compressing while the piston 102 is reciprocating within the cylinder.

It will be appreciated by those skilled in the art that changes could be made to the embodiments described above without departing from the broad inventive concept thereof. Furthermore, it should be appreciated that the structure, features, and methods as described above with respect to any of the embodiments described herein can be incorporated into any of the other embodiments described herein unless otherwise indicated. It is understood, therefore, that this invention is not limited to the particular embodiments disclosed, but it is intended to cover modifications within the spirit and scope of the present disclosure. Further, it should be appreciated, that the term substantially indicates that certain directional components are not absolutely perpendicular to each other and that substantially perpendicular means that the direction has a primary directional component that is perpendicular to another direction.

We claim:

1. A circlip comprising:
    a circlip body that defines (i) a first end surface, (ii) a second end surface that is spaced circumferentially from the first end surface so as to define a gap between the first and second end surfaces, and (iii) an outer curved surface that defines an outer perimeter of the circlip body, wherein the outer curved surface extends from the first end surface to the second end surface, and terminates at each of the first and second end surfaces;
    at least one row of teeth defined at the outer curved surface, wherein the at least one row of teeth extends from at least one of the first and second end surfaces circumferentially along a direction away from the gap, and
    the circlip body defines an upper surface and a lower surface that is spaced from the upper surface along an axial direction, such that the outer curved surface extends from the upper surface to the lower surface;
    wherein, during use, one of the upper surface and the lower surface is subject to a rotational force while the at least one row of teeth of the outer curved surface engage a circlip groove to limit rotation of the circlip;
    wherein the circlip body defines an inner curved surface spaced from the outer curved surface along a radial direction, and at least one of the teeth that is disposed circumferentially closer to one of the first and second end surfaces than the other of the first and second end surfaces is inclined toward the one of the first and second end surfaces as it extends along the radial direction from the inner curved surface to the outer curved surface.

2. The circlip of claim 1, wherein the circlip body comprises a first coupling member extending from the first end surface away from the gap and a second coupling member extending from the second end surface away from the gap, wherein the first and second coupling members are configured to receive a compressing force from an instrument so as to decrease the gap when inserting the circlip into a receiving groove of a piston.

3. The circlip of claim 2, wherein:
    the circlip body further defines (i) an inner surface that is opposite the outer curved surface, and (ii) a middle portion that extends from the first coupling member to the second coupling member, the middle portion defining a middle-portion width from the outer curved surface to the inner surface; and
    at least one of the first and second coupling members defines a coupling member width from the outer curved surface to the inner surface, such that the coupling member width is greater than the middle-portion width.

4. The circlip of claim 2, wherein:
    the circlip body defines a first aperture that extends through the first coupling member in the axial direction, and the first coupling member extends from the first end surface away from the gap to at least the first aperture;
    the circlip body defines a second aperture that extends through the second coupling member in the axial direction, and the second coupling member extends from the second end surface away from the gap to at least the second aperture.

5. The circlip of claim 2, wherein the at least one row of teeth that extend at the outer curved surface along at least a portion of the first coupling member, and teeth that extend at the outer curved surface along at least a portion of the second coupling member.

6. The circlip of claim 1, wherein the at least one row of teeth terminates at each of the first and second end surfaces.

7. The circlip of claim 6, wherein the at least one row of teeth includes a first portion that extends from the first end surface away from the gap, and a second portion that extends from the second end surface away from the gap, such that the outer curved surface is substantially smooth between the first and second portions.

8. The circlip of claim 1, wherein the teeth of the at least one row of teeth are knurled.

9. A circlip comprising,
    a curved circlip body that defines an outer curved surface that defines an outer perimeter of the circlip body, and an inner curved surface opposite the outer curved surface along a radial direction, such that the inner curved surface defines an inner perimeter of the circlip body;
    a first coupling member defined by a first end of the circlip body;
    a second coupling member defined by a second end of the circlip body, wherein the second end is spaced from the first end so as to define a gap between the first end and the second end;
    a plurality of teeth defined at the outer curved surface at each of the first and second coupling members; and
    a middle portion defined by the circlip body at a location between the first and second coupling members,
    wherein (i) the first coupling member defines a first coupling member width along the radial direction from the inner curved surface to the outer curved surface, (ii) the second coupling member defines a second coupling member width along the radial direction from the inner curved surface to the outer curved surface, and (iii) the middle portion defines a middle-portion width along the radial direction from the inner curved surface to the outer curved surface, such that the middle-portion width is less than each of the first and second coupling member widths, wherein at least one of the plurality of teeth that is disposed circumferentially closer to the first end of the circlip is inclined toward the second end of the circlip as it extends along the radial direction from the inner curved surface to the outer curved surface, and wherein at least one of the plurality of teeth that is disposed circumferentially closer to the second end of the circlip is inclined toward the first end of the circlip as it extends along the radial direction from the inner curved surface to the outer curved surface.

10. The circlip of claim 9, wherein the circlip body defines a first aperture that extends through the first coupling member, and the circlip body further defines a second aperture that extends through the second coupling member.

11. A circlip comprising:
a circlip body that defines a central axis oriented along an axial direction, wherein the circlip body defines an inner curved surface and an outer curved surface spaced from the inner curved surface along a radial direction that is perpendicular to the axial direction;
a first coupling member that extends in a circumferential direction about the central axis,
a first plurality of teeth defined at the outer curved surface, the first plurality of teeth arranged along at least a portion of the first coupling member;
a second coupling member that extends in the circumferential direction about the central axis, wherein the circlip body defines a circumferential gap that extends from the first coupling member to the second coupling member; and
a second plurality of teeth defined at the outer curved surface, the second plurality of teeth arranged along at least a portion of the second coupling member, wherein the first coupling member is spaced from the second coupling member along the circlip body in the circumferential direction;
wherein at least one of the plurality of teeth that is disposed circumferentially closer to the first end of the circlip is inclined toward the second end of the circlip as it extends along the radial direction from the inner curved surface to the outer curved surface and wherein at least one of the plurality of teeth that is disposed circumferentially closer to the second end of the circlip is inclined toward the first end of the circlip as it extends along the radial direction from the inner curved surface to the outer curved surface.

12. The circlip of claim 11, further comprising a middle portion that extends about the central axis of the circlip in the circumferential direction from the first coupling member to the second coupling member, wherein at least a length of the outer curved surface in the circumferential direction is smooth at the middle portion.

* * * * *